United States Patent [19]

Johnson et al.

[11] 4,203,161
[45] May 13, 1980

[54] METHOD OF ENHANCING COMMON DEPTH POINT SEISMIC DATA

[75] Inventors: Jay P. Johnson, Houston; Alvin L. Parrack, Bellaire; Delbert R. Lunsford, Houston, all of Tex.

[73] Assignee: Texaco Inc., White Plains, N.J.

[21] Appl. No.: 305,386

[22] Filed: Nov. 10, 1972

Related U.S. Application Data

[63] Continuation-in-part of Ser. No. 230,810, Mar. 1, 1972.

[51] Int. Cl.$^2$ ............................................. G01V 1/36
[52] U.S. Cl. ........................................ 367/40; 367/43; 367/63; 364/421
[58] Field of Search ............... 340/15.5 MC, 15.5 DP, 340/15.5 CC; 444/1; 364/421

[56] References Cited

U.S. PATENT DOCUMENTS

| | | | |
|---|---|---|---|
| 3,496,531 | 2/1970 | Sullivan et al. | 340/15.5 CC |
| 3,550,074 | 12/1970 | Kerns et al. | 340/15.5 DP |
| 3,622,966 | 11/1971 | George, Jr. | 340/15.5 CC |
| 3,638,177 | 1/1972 | Lindblade | 340/15.5 MC |
| 3,696,331 | 10/1972 | Gunzy et al. | 340/15.5 DP |
| 3,714,621 | 1/1973 | Waters | 340/15.5 CC |

*Primary Examiner*—Howard A. Birmiel
*Attorney, Agent, or Firm*—Carl G. Ries; Thomas H. Whaley; William J. Beard

[57] ABSTRACT

A method of enhancing a "gather" formed of a plurality of unmoved out common depth point (CDP) data traces. The gather is formed of a plurality of seismic traces arranged in a display in which time varies along the horizontal axis and distance between source and detector (range) varies along the vertical axis. The gather is incrementally processed by cross correlating trace segments within a defined area or search window. To this end, the center trace within the window is selected as a reference trace which is multiplied by a taper function and cross correlated with the other traces in the window to provide a coherent trace and a separate noise trace, both of which are produced in the output. The window is shifted on the gather and the procedure is repeated until every trace has been processed. In the cross correlation technique, the trace segments in the window are examined along a derived hyperbolic curve. To this end, the traces are time shifted to the positions producing optimum alignment with the reference trace along the hyperbolic curve and are then summed with the reference trace segment along the curve and averaged. The resultant coherent trace is multiplied by a taper function and reproduced in the output in time alignment with the reference trace. A separate noise trace is also obtained by subtracting the coherent trace from the reference trace. The cross correlation proceeds through the entire gather at half window increments until a new gather is formed. Also disclosed is a method for deriving the hyperbolic curves connecting common events at the center of each window.

17 Claims, 9 Drawing Figures

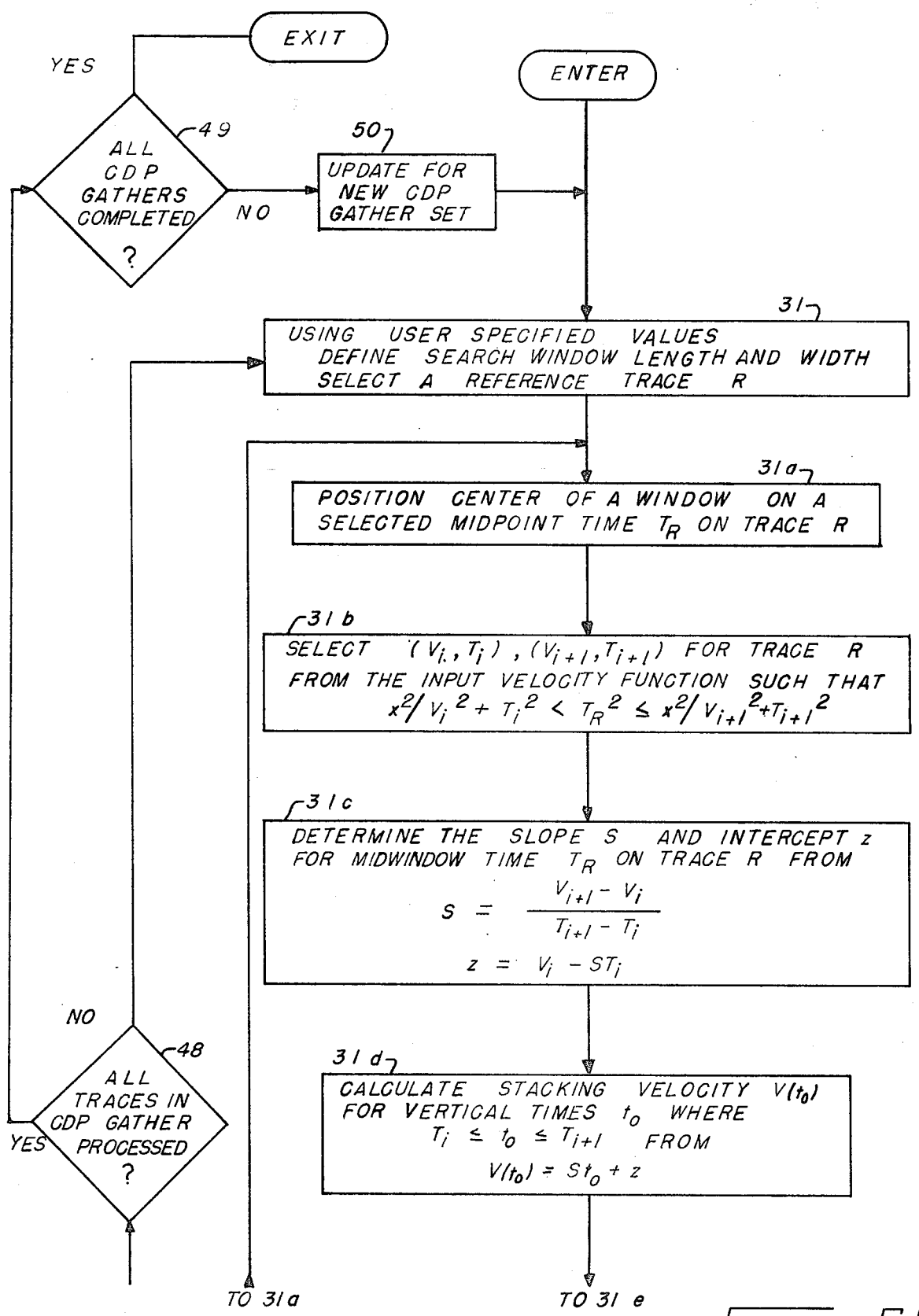
Fig_6A

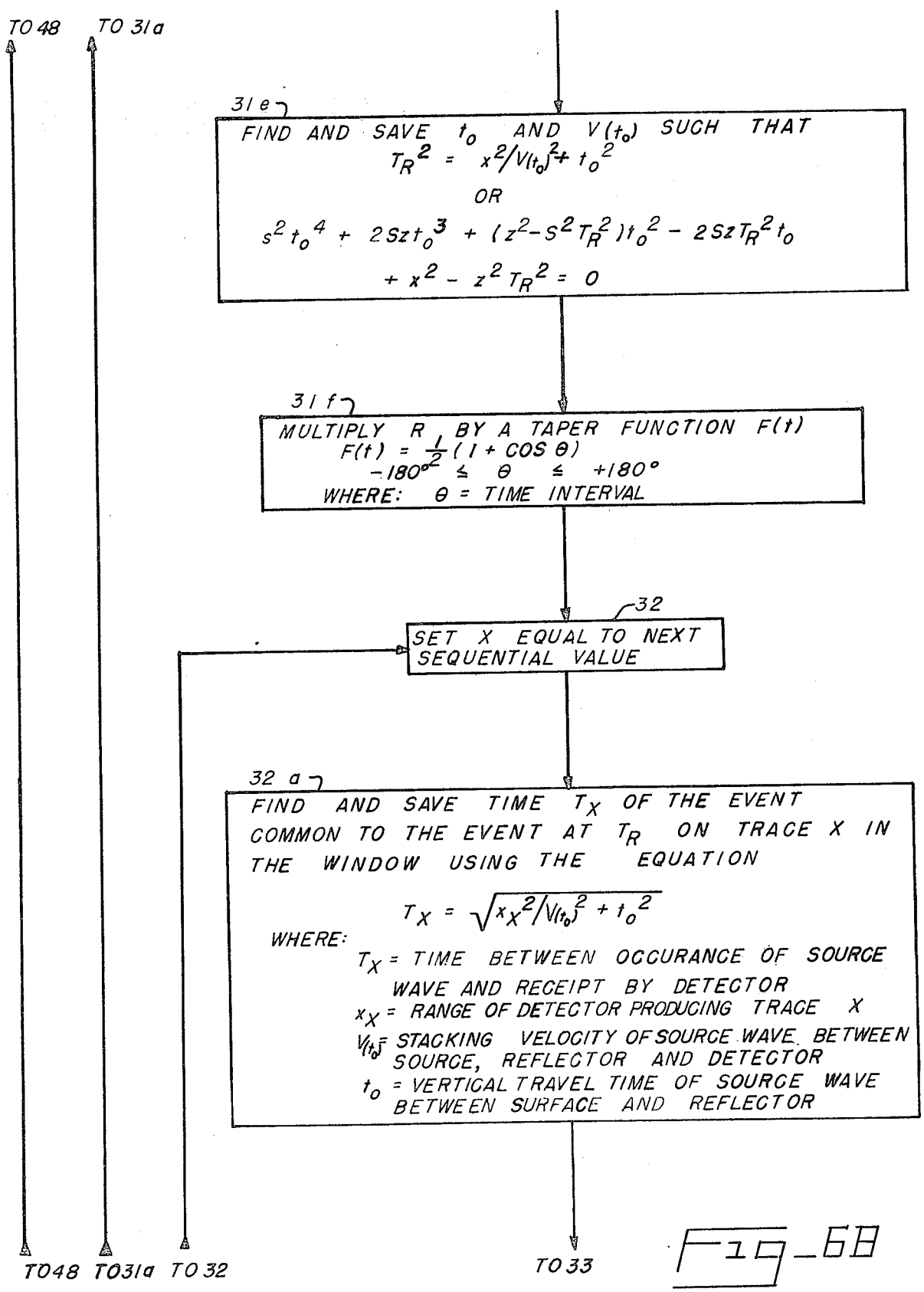

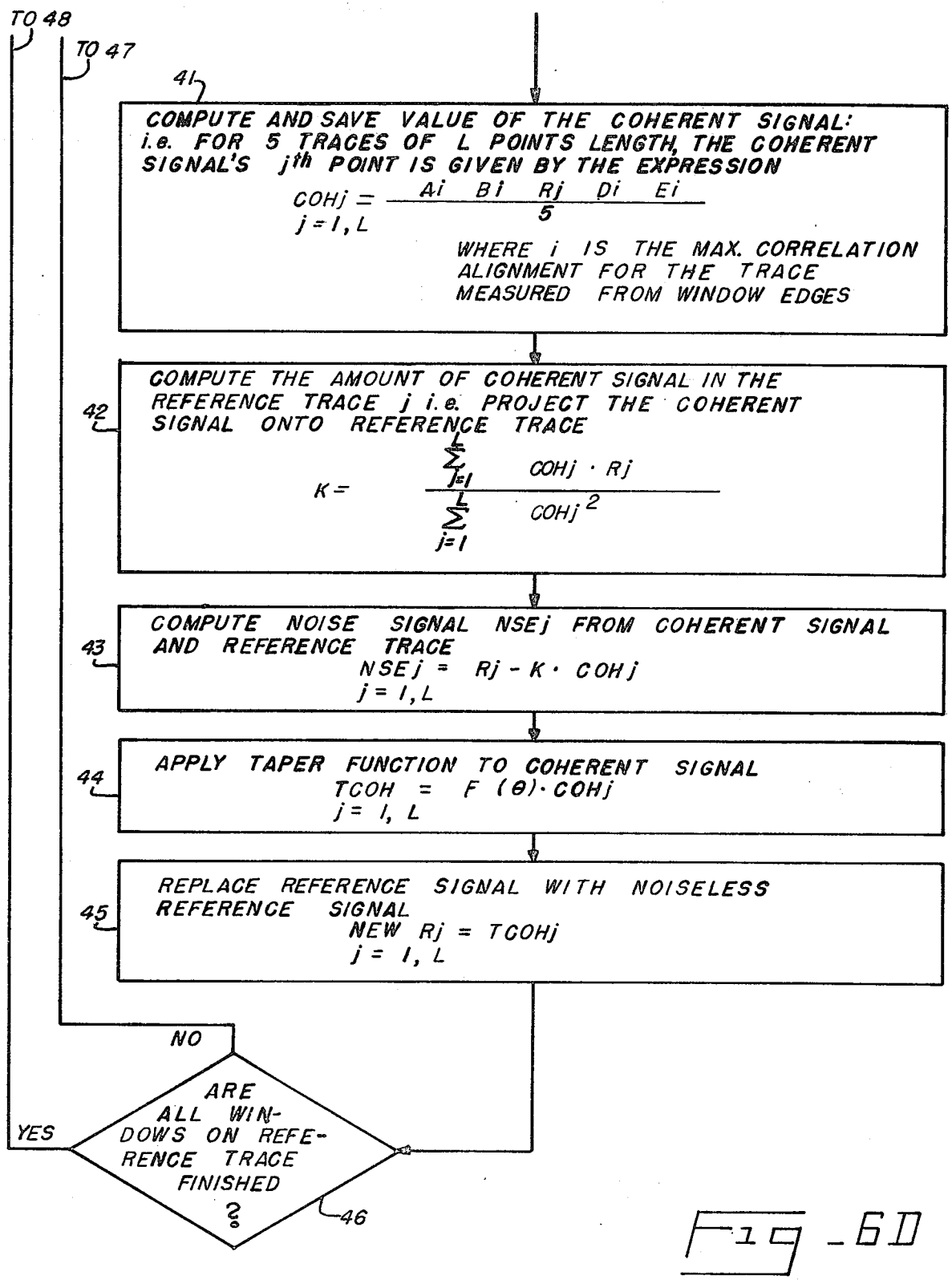
Fig_6D

METHOD OF ENHANCING COMMON DEPTH POINT SEISMIC DATA

CROSS REFERENCE TO RELATED APPLICATIONS

This application is a continuation-in-part of application Ser. No. 230,810 filed Mar. 1, 1972, and entitled METHOD FOR ENHANCING SEISMIC DATA.

BACKGROUND OF THE INVENTION

1. Field of the Invention

While other applications of the present method are possible, the method is intended primarily for enhancing seismic data. In particular, the method is employed to enhance common depth point seismic data.

2. Brief Description of the Prior Art

It is conventional in seismic prospecting to arrange detectors along a line at equally spaced locations on the earth's surface. Energy sources disposed at equally spaced locations along the same line are then activated to produce seismic energy waves which spread out from the energy source in all directions. Vibrating devices and explosive devices are common examples of such energy sources. The seismic waves generated by the source are reflected, refracted and diffracted from subsurface interfaces in the earth and some of these diverted waves are received by the detectors. For purposes of brevity, reflections, refractions and diffraction will be referred to herein jointly as "reflections". The output records of seismograms produced by each of the detectors show when a diverted wave was received and give information about the time duration and intensity of the wave. These output records from the detectors can be studied to extrapolate information regarding the type and location of the subsurface formations producing the received waves. This information in turn is employed to evaluate the subsurface formations for their oil and gas bearing properties.

Because of the geometry involved, seismic waves reflected from a given subsurface point may be received by one detector from energy emitted from a first energy source and also by a second detector from energy emitted from a second energy source. This phenomenon is employed in developing common depth point (CDP) data. Because of the redundancy of information obtained in this technique, the signals may be combined or averaged so that a high signal-to-noise ratio is obtainable. In common practice, from 3 to 48 source-detector pairs are employed to develop a "gather" of CDP traces. A plurality of gathers are then combined to form a record.

A characteristic of the detector seismogram in common depth point prospecting is that the same events, i.e. trace excursions caused by reflections from the same subsurface point, tend to occur later in time on the seismogram as the distance between the energy source and the detector increases. This phenomenon is termed "normal moveout". The effect when a series of adjacent traces from a gather are assembled to form a display in which time "t" varies along the horizontal axis and detector-to-source spacing "x" varies along the vertical axis is that the reflections from common events tend to lie along a hyperbolic curve having a slope dx/dt which is an apparent velocity. This apparent velocity is termed the "stacking velocity".

It is conventional to alter the individual CDP seismic traces as required to correct for normal moveout so that the common events tend to align along a vertical line rather than a hyperbolic curve. Correction for normal moveout makes it easier for many conventional signal enhancement techniques to be employed.

In the parent of the present application, the raw seismic data from the detectors is preferably preconditioned before being enhanced by the method therein disclosed. The preconditioning techniques include correction of a gather for normal moveout followed by "stacking" which is a summing of common events on a display of CDP seismograms to produce a single resulting trace. The preconditioned data traces from a plurality of gathers are processed and assembled to form a display in which common events align in time.

While the preconditioning steps of correcting for normal moveout and stacking produce an enhanced signal which under many circumstances is very desirable, these procedures also tend to average in noise and other invalid data. Subsequent processing of the enhanced data also involves approximations and averaging so that the end result is enhanced data which is two processing phases removed from the original data. The initial step may obscure the noise and invalid information so that the second step is prevented from operating at optimum capability for signal enhancement.

SUMMARY OF THE INVENTION

CDP seismograms taken directly from the detectors are converted from analog to digital form and grouped in a conventional time vs. range configuration to form a gather. The entire gather is processed incrementally within processing windows to convert each of the input seismograms to two traces, one of which is an enhanced coherent signal and the other of which is a noise signal. The coherent signals are reproduced in time alignment with their respective input seismograms to form an enhanced gather which exhibits the same moveout as the input gather. The noise signals are assembled in time alignment with their original appearance in the input signals to form a noise gather which can also be employed in analyzing the subsurface formations.

The processing window width is defined by the number of adjacent traces selected to be examined and its length is defined by the number of time increments selected. The trace segments included within the window are then examined for coherence with the center trace segment which functions as the reference trace for that particular window. The coherence examination is effected by a cross correlation procedure in which each trace within the window is time shifted relative to the reference trace to the position at which it most closely corresponds to the reference trace. The time shifting and examination for correspondence are made relative to the expected hyperbolic curve through the center of the window along which common events in the trace segments would tend to align. The method of the present invention defines the hyperbola of common events for each new window from range data and data extracted from a user supplied input velocity function.

When the optimum alignment along the hyperbola is found, the signal amplitudes at the same data point distances from the hyperbola are averaged and the resultant signal, defined as the "coherent" signal, is reproduced in the output in time alignment with the reference trace. A noise trace is produced by subtracting the coherent trace from the reference trace and producing the difference trace in the output in time alignment with its time position in the reference trace. The program then proceeds by moving the window one-half window width to the right and repeating the described cross correlation technique. At each processing increment, the reference trace and resulting coherent trace are multiplied by a taper function which ensures that the ends of adjacent trace segments in subsequent windows will merge. The cross correlation procedure is repeated until the entire gather has been processed. All of the gather sets forming a conventional record may be processed in the described way.

The enhanced gather which is in time alignment with the original gather may be further processed by any conventional procedure. Thus, if desired, the gather may be corrected for normal moveout and stacked. It may also be desirable to stack the enhanced gather by summing the traces in each window along the hyperbolas.

From the foregoing, it will be appreciated that a primary object of the present invention is to provide a method of enhancing seismic signals whereby noise and other invalid data are separated from desired valid data in the seismic signal.

It is an object of the present invention to provide a method for enhancing gathers of common depth point seismograms before the gathers are stacked or corrected for normal moveout.

Another object of the present invention is to process a gather of CDP seismograms by extracting a coherent signal and a noise signal from each seismogram and forming a gather of each in exact time correspondence with the original gather before the original gather is otherwise processed.

A related object of the present invention is to provide a method for extracting values of acoustic velocity and vertical travel times from an input velocity function for use in defining expected hyperbolas along which common events align.

The foregoing and other objects, features and advantages of the invention may be more fully understood from the drawings and from the related description which follows.

BRIEF DESCRIPTION OF THE DRAWINGS

FIGS. 6A, 6B, 6C and 6D illustrate a flow chart of a digital computer program for performing the method of the present invention.

DESCRIPTION OF THE PREFERRED EMBODIMENT

Figure 1:
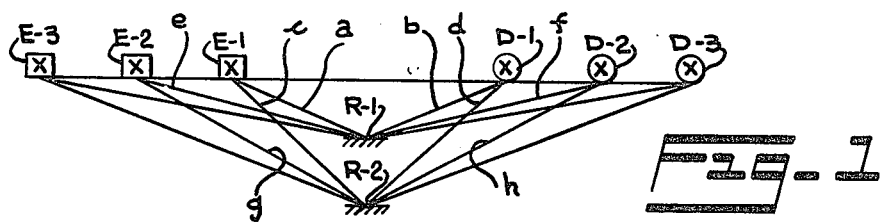
FIG. 1 is a schematic representation illustrating a geophone source and detector array for obtaining CDP seismograms.

FIG. 1 schematically illustrates an array of energy sources E-1, E-2 and E-3 and detectors D-1, D-2 and D-3 which are disposed along a common line on or near the surface of the earth. The array illustrated in FIG. 1 is exemplary of one method for obtaining common depth point seismograms. When the energy source E-1 is activated, one component of the generated seismic wave travels along straight line a until it hits a subsurface interface or reflector R-1 which causes it to be reflected upwardly along the path b toward the detector D-1. A second component of the energy wave from the source E-1 travels along the path c until it meets a reflector R-2 which directs the wave along the line d to the detector D-1. The resulting trace formed in the seismogram produced by the detector D-1 is illustrated schematically in FIG. 2 as seismograph trace S-1 in a gather SR. The gather SR shows time t increasing to the right along the horizontal axis and detector-to-source spacing (range) x increasing upwardly along the vertical axis. The excursion 1R-1 represents the reflection from the subsurface point R-1 and the excursion 1R-2 represents the reflection from the point R-2. It will be noted that the excursion 1R-1 occurs earlier than the excursion 1R-2. This is attributable to the fact that the length of path ab is shorter than that of cd.

When the energy source E-2 is activated, a seismic wave travels down along the path e to the reflector R-1 and up along the path f to the detector D-2. Other waves from the source E-2 travel down along the path g to reflector R-2 and up the path h to the detector D-2. The resulting seismogram is represented at S-2 in FIG. 2. In the seismogram S-2, the excursion 2R-1 represents the reflection from the subsurface point R-1 and the excursion 2R-2 represents the reflection from the subsurface point R-2. By comparing S-1 and S-2, it may be appreciated that the excursions in the seismogram S-2 occur later in time than the excursions caused by reflections from the same subsurface points on the seismogram S-1. This is attributable to the fact that the pathways from the energy source E-2 to the common reflectors and to the detector D-2 are greater than those between the source E-1, the common reflectors and the detector D-1. Seismic trace S-3 shows excursions 3R-1 and 3R-2 which are later in time than the corresponding excursions caused by the same reflectors in seismograms S-2 and S-1.

Figure 2:
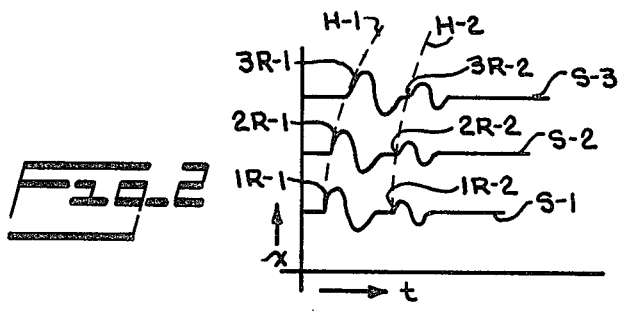
FIG. 2 is a schematic representation of a partial gather formed from the seismograms obtained by the array depicted in FIG. 1.

When a plurality of seismograms similar to S-1, S-2 and S-3 are obtained with a large number of source-detector pairs and assembled as illustrated in FIG. 2, the reflections from the same subsurface point, termed common events, tend to fall along a hyperbolic curve such as the curve H-1 connecting the common events from the reflector R-1. A second hyperbolic curve H-2 connects the common events from the reflector point R-2. For reasons which will be more fully explained hereafter, the reflections from each different common reflector will tend to align along a different hyperbolic curve. Because of the increasing path lengths involved and because of an increase in acoustic velocity associated with increasing depth, as a general rule, the curves connecting common events tend to become more linear and more vertical as the common events occur later in the record.

Figure 3:
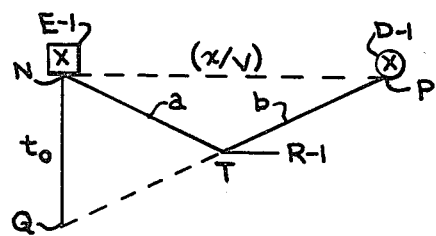
FIG. 3 is a graphic illustration of the method employed for determining the arrival time of a reflected seismic wave at a detector.

In order to properly cross correlate a plurality of traces forming a conventional gather, it is usually necessary to consider the reflection from one subsurface reflector with the reflections in all of the other traces from the same reflector. Where computerized analytical procedures are employed to make this correlation, some means is required to identify or locate such common events in each of the seismograms. It is known that the arrival time of a seismic wave can be estimated by the approximation $$T = \sqrt{x^2/V(t_o)^2 + t_o^2} \tag{1}$$

where
T = the time between generation of the source wave and its receipt by the detector
x = the horizontal spacing between the energy source and the detector (range)
$V(t_o)$ = the stacking velocity of the seismic wave along the path from the source to the reflector and to the detector
$t_o$ = the vertical travel time from the surface down to the reflector and back to the surface of the source wave The foregoing relationship expressed in equation (1) can be better understood by reference to FIG. 3 in which the energy source E-1, reflector R-1 and detector D-1 are illustrated schematically. If the line between R-1 and D-1 is projected from R-1 to a point Q to form the image of the path b, a right triangle is formed between points Q, N and P. The length NQ then represents the vertical travel time, the length QP (equal to a+b) represents the travel time T between the source and the detector and the length NP expressed in terms of time, is equal to $x/V(t_o)$. From the Pythagorean theorem, it is known that $(QP)^2 = (NP)^2 + (NQ)^2$ or, expressed differently, $T = \sqrt{x^2/V(t_o)^2 + t_o^2}$. It will be appreciated that the value of T varies for each new range value, for each new reflector depth, and for each new value of average velocity. The velocity is not a constant value, but rather is dependent upon a number of factors and changes along the path of the seismic wave. In general, the velocity of the seismic wave increases with increasing depth. This phenomenon is attributable to the fact that subsurface formations normally increase in density with increasing depth and acoustic energy travels more rapidly through denser formations.

Figure 4:
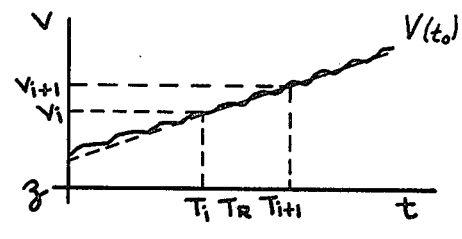
FIG. 4 is a graphical illustration of an exemplary velocity function for seismic waves.

FIG. 4 illustrates a typical velocity function $V(t_o)$ in which velocity increases upwardly along the vertical axis and time t increases to the right along the horizontal axis. This velocity function is obtained through a variety of methods including, estimation, curve fitting techniques, sound logging and other conventional methods. Generally, the velocity function $V(t_o)$ provides an approximation which is suitable for the application of most analytical procedures.

The energy source-to-detector spacing information x is readily available from direct measurements at the survey location. The vertical travel time $t_o$ and the stacking velocity $V(t_o)$ can be obtained from experiments conducted in the field or from the seismic data itself. They may also be obtained as disclosed herein by automated analytical techniques from a given velocity function $V(t_o)$.

Figure 5:
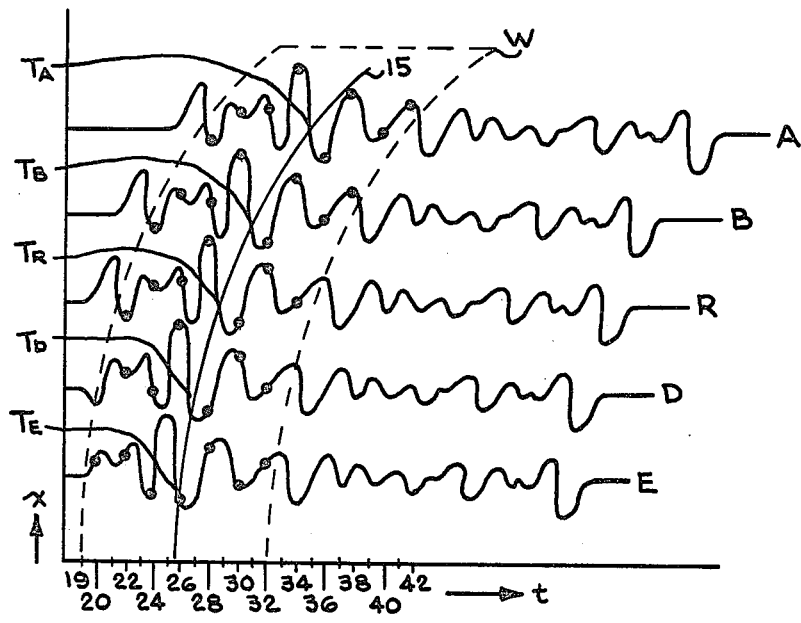
FIG. 5 is a portion of a seismic gather of unmoved out data illustrating a processing window employed in the method of the present invention.

Referring to FIG. 5, a portion of a conventional seismic gather is illustrated. As depicted in FIG. 5, time t increases to the right along the horizontal axis and range x increases upwardly along the vertical axis. Five seismic traces, A, B, R, D and E are illustrated in FIG. 4. The seismic traces have not been corrected for normal moveout so that common events tend to fall along an approximate hyperbolic curve such as the curve 15. In the method of the present invention, the cross correlation technique employed to enhance the data requires that the entire record be broken down into small portions, or windows W, each of which includes a plurality of trace segments as shown in FIG. 5. The trace segments within each of the windows are correlated by comparing a reference trace segment with every other segment in the window to separate the reference trace segment into a coherent signal and a separate noise signal. This correlation procedure is incremented along the reference trace a half window at a time until the entire trace has been separated into a coherent signal and a noise signal. The procedure is repeated with another trace forming the reference trace until the entire gather has been processed. The correlation technique applied within each window seeks first to determine the particular time alignments of the traces within the window which produce maximum correspondence with the reference trace. When these alignments are established, the values of all of the traces at equal time increments from the hyperbola are summed and averaged and the resultant signal is formed as an output signal in time synchronization with the reference trace. This enhanced output signal or coherent signal is subtracted from the reference signal to form the noise signal.

The procedure of the present invention is similar to that described in the parent application except that the processing herein is performed on only data which is uncorrected for moveout. A second related distinction is that the search windows employed in the present method are hyperbolic rather than rectangular. Using the terminology of the parent application and referring jointly to FIGS. 5 and 6, the window W is defined as having a length of 13 time points or increments and a width of five traces. Thus, the window W has a left edge which is six time points to the left of the curve 15 and a right edge six time points to the right of the curve for each of the traces within the window. The zero reference for the cross correlation procedure of the present invention is the left hand edge of the window W. It will be appreciated that since the window edges curve hyperbolically parallel to the center curve 15, the zero reference for each of the traces occurs at a different place along the horizontal axis. A plurality of such search windows are processed sequentially until all the data presented in the input gather set have been enhanced. While the search window W has been defined as having a width of five traces and a length of 13 time points, other widths and lengths could be employed in the process of the invention. It is preferable in order to optimize the number of computer operations used in processing the data that an odd number of data points be chosen for the window length and an odd number of traces be selected for the window width.

The amplitudes of the traces in FIG. 5 are provided in digital form by conventional analog-to-digital converting equipment. The values are taken at periodic time intervals established by a sampling rate which is calculated to reproduce a true representation of the analog signal. A digital number is thus supplied on each trace at the periodic time intervals marked off along the time axis. These amplitude numbers have been represented by dots on the traces at equally spaced time interval marks in the search window.

Figure 6C:
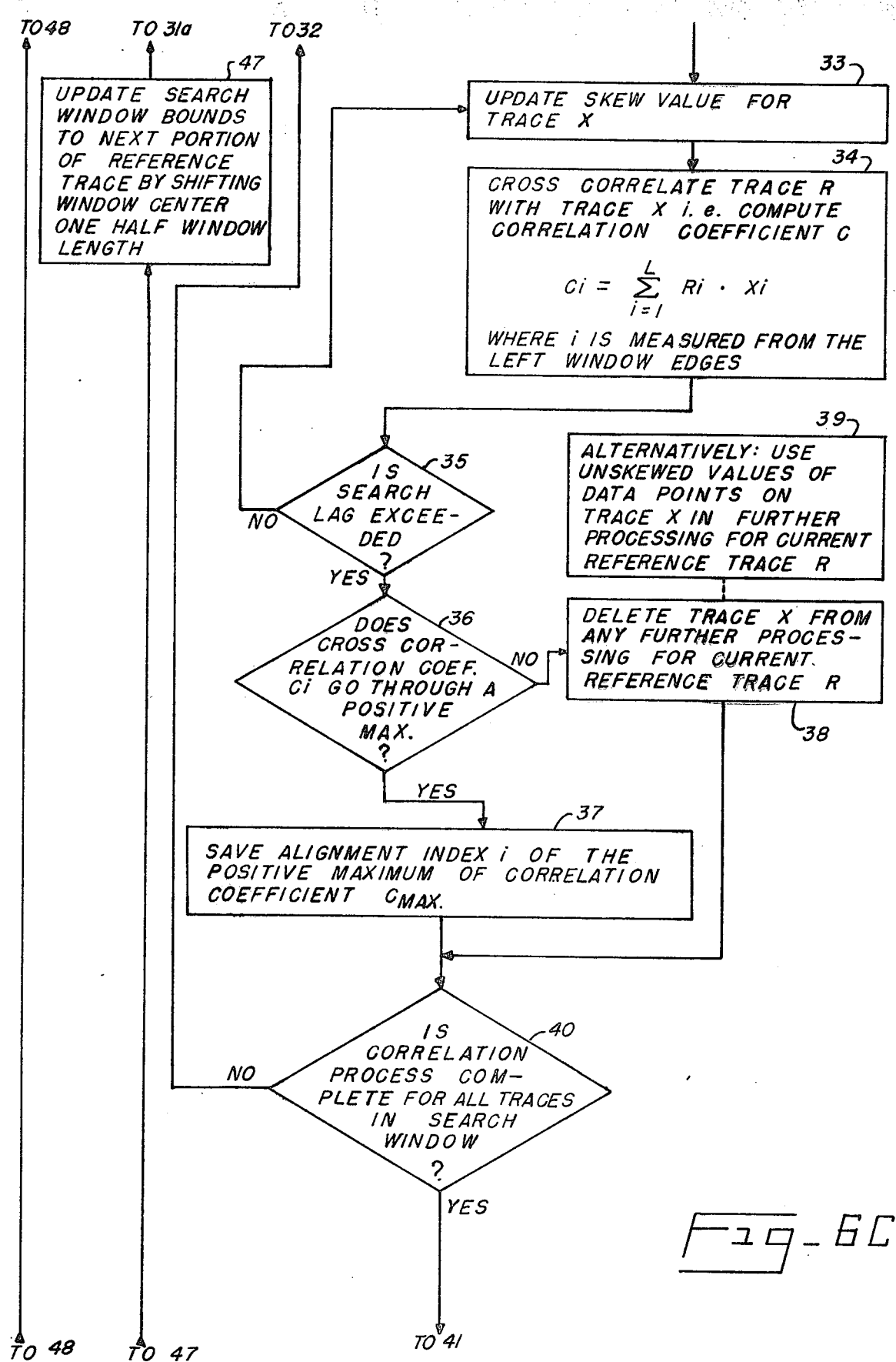

FIG. 6 illustrates a flow chart of a digital computer program for performing the data enhancing method of the present invention. The notations used in the flow chart of FIG. 6 refer to the traces shown in the example search window of FIG. 5. The computer program implemented by the flow chart of FIG. 6 may be thought of as a subprogram in a larger seismic data processing programming system which is utilized within general purpose digital data processing systems. Such a subprogram could be entered or called whenever appropriate by the programming system.

The initial processing step which is specified at block 31 of the flow chart is to define the search window boundaries relative to the data using the parameters specified by the user for the window length and width to be used. As a part of the first processing step, a trace in the CDP gather is initially selected to form the first reference trace. The trace R in the portion of the gather illustrated in FIG. 5 has been selected to be the initial reference trace. Once the reference trace has been selected, the center of the window W is positioned on a selected midwindow time $T_R$ on the trace R with the two traces A and B being included in the window above the trace R and the traces D and E being included in the window below the trace R. The next step of the cross correlation procedure requires that the times $T_X$ be found at which the event shown at time $T_R$ on trace R occurs in each of the other traces in the window. As a computational parameter, the particular trace being examined or compared with the reference trace R will hereafter be referred to generally as trace X. Thus, each of the traces A, B, D and E will be trace X when being acted upon or examined in the program. To determine $T_X$, it is necessary to know the value of V and the value of $t_o$ to employ in equation (1) $T = \sqrt{x^2/V(t_o)^2 + t_o^2}$. Thus, each time the window W is incremented along the reference trace R to a new window midpoint time $T_R$, a new value of $V(t_o)$ and $t_o$ satisfying equation (1) for the new $T_R$ must be determined. From these new values of $V(t_o)$ and $t_o$, and with the range x being one of the input parameters, the midpoint times $T_X$ for the window on traces A, B, D and E may be calculated.

To determine the velocity and time pair for each new $T_R$, the program of the present invention employs the input velocity-time pairs $(V_i, T_i)$ and $(V_{i+1}, T_{i+1})$ from the input velocity function $V(t_o)$. For purposes of aiding the description to follow, points $V_i$, $V_{i+1}$, and $T_i$, $T_{i+1}$ have been marked on the velocity function illustrated in FIG. 4. The velocity function is assumed to be linear between the two points. Beginning with $i=1$ the program determines the slope $$S = \frac{V_{i+1} - V_i}{T_{i+1} - T_i}$$

and the intercept $$z = V_i - ST_i$$

so that the linear equation $$V(t_o) = ST_o + z \quad (2)$$

gives the stacking velocity $V(t_o)$ for vertical times, $t_o$, satisfying $$T_i \leq t_o \leq T_{i+1}.$$

After the slope and intercept have been determined for the ith consecutive velocity-time pairs $(V_i, T_i)$, $(V_{i+1}, T_{i+1})$ then the program calls a subroutine to find the pair $(t_o, V(t_o))$ satisfying equation (1) for the midpoint time $T_R$ of the window on trace R. Substituting equation (2) in equation (1), one has $$T_R^2 = \left(\frac{x}{St_o + z}\right)^2 + t_o^2$$

which becomes $$S^2 t_o^4 + 2Szt_o^3 + (z^2 - s^2 T_R^2)t_o^2 - 2SzT_R{}^2 t_o + x^2 - z^2 T_R^2 = 0, \quad (3)$$

a fourth degree polynomial equation in $t_o$. The subroutine uses Descarte's method for solution of the quartic to find a real root, $t_o$ of equation (3) such that $0 < t_o < T_R$. If this root does not satisfy the inequality $T_i < t_o \leq T_{i+1}$ then the solution steps are repeated with i replaced by i+1.

The solution just described is depicted in the flow chart at blocks 31b, 31c, 31d and 31e.

While the computer program of the present invention employs Descarte's method for solving quadratic equation (3), it will be appreciated that other solutions, including iterative solutions, are possible. Thus, the objective is to determine the value of velocity and vertical travel time for the selected midwindow time $T_R$ on the reference trace R.

The next step of the program is to multiply the reference trace segment within the window by a taper function F(t) which is defined in block 31f. This step permits the information at the center of the window to be weighted more heavily in the cross correlation procedure to be described.

The next step in the program indicated at block 32 is to select the initial trace to serve as the trace X for the cross correlation procedure to be described. During this cross correlation procedure, the trace X is compared to the trace R for coherence. Any desired sequence of comparing the four traces included in the window with the trace R may be employed. It is preferable, however, to employ the sequence X=B, X=A, X=D, and X=E for the coherence alignment procedure to be described.

When the desired trace X has been selected, the next step in the procedure depicted as Block 32a is to find and save the midwindow time $T_X$ of the event common to the event at $T_R$ on trace X in the window W. This is done using the value x for the range, which is available as an input parameter to the program, and the values of $V(t_o)$ and $t_o$ determined by the process described at blocks 31b, 31c, 31d and 31e. For trace B, the value for $T_X$ has been shown in FIG. 5 as $T_B$. Having established the time $T_B$, the left edge of the window is defined by measuring to the left of the point $T_B$ by six time increments and the right edge of the window is determined by measuring to the right of point $T_B$ by six time increments.

In the procedure for comparing the currently specified adjacent trace X with the reference trace R for coherence, a series of cross-correlation computations is performed between the reference trace and the adjacent trace. This operation is begun by mathematically skewing the adjacent trace X to the left relative to the midwindow point $T_X$ by an initial amount equal to the search lag SL (in the case of FIG. 5, SL=2 data points to the left of the midwindow point and two data points to the right of the midwindow point) in time. The search lag SL is the amount of time shift to be allowed in the correlation process. This operation is indicated at block 33 of FIG. 6. By appropriate choice, the search lag SL may be chosen to prevent spurious alignment of the reference trace R and trace X on multiples, or to avoid coherence alignment with other seismic events having large time "step out".

When the proper skew is obtained at block 33, the program proceeds, at block 34, to cross-correlate the skewed trace X with the reference trace R by computing the correlation coefficient $C_i$ corresponding to this alignment as indicated. The values of $R_i$ and $X_i$ are measured beginning at the left window edges. A test is then performed, as indicated at block 35, to determine if the search lag has been exceeded. If the search lag has not been exceeded the program loops back to block 33, shifts the trace X to the right one data point updating the alignment index i, to repeat the cross-correlation of trace X and the reference trace. This is repeated until the trace X has been shifted two data points to the right of $T_x$. Any further shift exceeds the search lag and produces a yes answer at block 35.

When all correlations in the range of the search lag have been performed the correlation coefficients $C_i$ are tested at block 36 to determine if the $C_i$ go through a positive maximum. If the $C_i$ coefficients do have a positive maximum this means that a coherence having a positive amplitude exists in the search window between the reference trace and the adjacent trace X just examined. If this condition occurs the program saves the alignment index value i at which the $C_i$ maximum occurs and proceeds to block 40. If a positive maximum of the correlation coefficients $C_i$ does not occur then alternative procedures as described at blocks 38 and 39 can be followed. At block 38 one alternative (i.e., that of deleting this portion of trace X from further processing) is described. At block 39 the alternative of using the data points of trace X which lie within the search window in its unskewed position (i.e., in time alignment along the hyperbola 15 with the reference trace) is described. The condition of finding no positive maximum of the correlation coefficients $C_i$ indicates, in some sense, a deficiency in the data of trace X in the correlation comparison with the reference trace. The trace X data may be too noisy, too smooth or too time skewed to correlate well with the reference trace R. Of course these same things could be wrong with that portion of the reference trace R in the search window, also. By following one of the two alternatives at block 38 or block 39 the unusual data from trace X is appropriately utilized in the processing.

In any event, the program then proceeds to block 40 where a test is performed to determine if all adjacent traces in the search window have been examined for correlation with the reference trace R. If not the program loops back to block 32 where X is updated to the next adjacent trace to be correlated in the sequence previously described (i.e., B, A, D, E). If a coherence alignment along the hyperbola was noted, say between trace B and the reference trace R, then on the next correlation attempt any shift in the time alignment of coherence so noted is extrapolated to the next trace when it is examined for correlation with the reference trace R. For example, if a time alignment of one left shift produced a coherence maximum between trace B and trace R, then the effective left hyperbolic edge of the search window is placed at this same time shift location on trace R before cross-correlating with trace A would begin. The search lag would then extend two additional points to the left of this new window left edge. This process allows gentle dips to be followed more easily than if strict coherence along the hyperbola is required in the process.

When the test at block 40 passes through the "yes" branch all adjacent traces in the window have been examined for coherence with the reference trace and their alignments have been found. The program is then prepared to define the coherent signal and to extract this coherent signal from the combined, "signal+noise" present on the input reference trace data. The coherent signal is determined by the method shown in block 41. That is, a linear average along the hyperbola 15 of the data points of the shifted traces A, B, D and E with the reference trace R is computed at each data point j of the reference trace. It should be noted that the coherent signal produced by this process is always time aligned with the reference trace R within the search window. This prevents spurious event shifting as caused by mixing or stacking techniques as used in the prior art.

The program then proceeds, at block 42, to determine the amount of coherent signal which is present in the reference trace R by computing the least squares coefficient K as indicated. It may be shown that K is actually the coefficient of best least squares fit of trace R to the coherent signal COH which minimizes the square of the difference of each data point on these two traces from each other. This may be thought of as providing a quantitative measure of the amount of coherent signal present in the reference trace R.

When K has been determined the amount of noise present at each point $R_j$ of the reference trace R may be computed as indicated at block 43. This simply subtracts the amount of coherent signal present at each point (i.e., K:COH$_j$) from the total signal (i.e., $R_j$) at each point. What is left after the substraction at each point is thought of as the noise component NSE$_j$ at that point on the reference trace.

The taper function F $(\theta)$ is then applied to the coherent signal to permit smooth transition at the boundary of the search window.

The final step in processing the data on a reference trace R in one search window is indicated at block 45. This is to replace the reference signal value at each data point with the tapered value of the coherent signal which is derived as indicated above. The incoherent noise as represented by the values NSE$_j$, computed at block 43 is also available for analysis or display if desired.

When enhanced reference signal values are computed, the program proceeds with the test at block 46 to determine if all search windows on the referece trace are finished. If there still remain reference traces to be finished within the record section or if additional search windows remain to be finished on a particular reference trace then the program moves on to a new reference trace. If a new search window displaced in time on the same reference trace from the one just finished is to be processed, then this is done at block 47. In either case the program loops back to complete all search windows and all reference traces in this manner by looping back to either block 32 or block 31a as appropriate.

In this manner a plurality of search windows are generated and the data within each search window is processed to produce one enhanced reference trace which is associated with each of the search windows. The enhanced trace contains only the coherent features of the data in the window. Due to the use of the taper function the processed data from adjacent search windows are assured a continuous boundary at the edge of the search windows. The process is repeated until each trace has beomce a reference trace and the entire gather section of data is complete.

When all of the traces in the CDP gather have been processed, a test is conducted at block 49 to determine if all CDP gathers have been processed. If not, the program is updated at block 50 and the next set of CDP gather traces is suppled as an input to the program at block 31. When all of the gather sets have been processed, the program is completed and the exit branch of block 49 is taken.

It will be appreciated that the foregoing may make other embodiments of the basic method of the present invention apparent to those skilled in the art. It is the intention to cover all such changes and modifications as come within the true spirit of the scope of the present invention in the appended claims.

We claim:

1. A method for enhancing digital seismic data said data having a coherent signal component comprising a measure of similarity between spatially related time series data, and a noise component in unmoved out form, comprising the steps of:
   (a) determining for a selected time $T_R$ on a selected seismic trace R, the estimated times $T_X$ on one or more additional traces included in the data at which possible events common to a possible event at $T_R$ occur;
   (b) determining, for a search window having edges equally spaced on either side of times $T_R$ the coherent signal component;
   (c) computing, by use of said coherent signal component, the component of said coherent signal extant in said selected trace $T_R$ and replacing in time alignment with said selected trace on an output signal record medium, that portion of said selected trace $T_R$ included in said search window with said component of the selected trace comprising said coherent signal portion; and
   (d) repeating the recited steps for other selected times and other selected traces until all said seismic data are so processed.

2. A method as defined in claim 1 further including the steps of:
   (a) replacing, in time alignment with said reference trace on an output noise record medium, that portion of said selected trace included in said search window, with the remainder of said selected trace which does not comprise said coherent signal portion; and
   (b) repeating the recited steps for other selected times and other selected traces until all said seismic data are so processed.

3. The method of claim 1 wherein the step of determining the coherent signal component associated with the portion of said selected trace R in said search window includes:
   (a) cross-correlating a plurality of adjacent seismic traces with the portion of said selected trace R in said search window and deriving a cross-correlation coefficient C for each such process;
   (b) time skewing said adjacent traces with respect to said selected trace into a plurality of preselected time positions and repeating the cross-correlation step for each adjacent trace at each such alignment;
   (c) determining for each adjacent trace the time alignment which produces a maximum of the computed cross-correlation coefficients C; and
   (d) computing, as a function of said maximum coefficient time alignments and of said selected trace R and said adjacent traces, the coherent signal.

4. The method of claim 3 wherein the step of computing the coherent signal includes;
   computing at each digital data point in said search window on said selected trace, the coherent signal component comprising the linear average of said selected trace data points and the time skewed adjacent trace data points falling in time alignment with the data points on said selected trace in said search window where the sum employed in said average is determined by summing the amplitudes at data points which have the same spacing from times $T_R$ and $T_X$.

5. The method of claim 3 wherein, prior to said cross-correlating step, the data points of said selected trace R are operated on by a mathematical operator to produce a tapered trace segment thereby allowing less influence on the cross-correlation step from data points near the edges of said search window.

6. The method of claim 5 wherein the mathematical taper operator F ($\theta$), used is of the form $$F(\theta) = \tfrac{1}{2}(1 + \cos \theta) - 180° \leq \theta + 180°$$

where $\theta$ represents the time dimension parameter of a seismic trace in said search window.

7. The method of claim 1 wherein all steps are repeated iteratively, more than once on the same seismic data thereby further enhancing the data on each such application.

8. The method of claim 3 wherein the step of replacing, in time alignment with said selected trace R on an output signal record medium, that portion of said selected trace included in said search window, with the component of said selected trace comprising said coherent signal portion includes operating on said coherent signal portion with a mathematical operator to taper the data points comprising said coherent signal portion thereby allowing a smooth transition of data from one search window area on said selected trace to adjacent search window areas on said selected trace.

9. The method of claim 8 wherein the mathematical taper operator F ($\theta$) used is of the form $$F(\theta) = \tfrac{1}{2}(1 + \cos \theta) - 180° \leq \theta \leq +180°$$

where $\theta$ represents the time dimension parameter of a seismic trace in said search window.

10. The method of claim 3 wherein the step of determining the coherent signal component is performed by:
   (a) cross-correlating a plurality of adjacent seismic traces X with the portion of said reference trace R in said search window and deriving a correlation coefficient $C_i$ according to the relationship $$C_i = \sum_{j=1}^{L} R_i \cdot X_i$$

where the index J=1, L represents the number of digital data points on the reference trace R and the adjacent trace X and the index i represents the i th such cross-correlation starting at the edge of said window;
   (b) time skewing each of said adjacent traces X with respect to said reference trace into a plurality of preselected time alignments and repeating the cross correlation step for each adjacent trace X at each such time alignment;

(c) determining, for each adjacent trace X the time alignment which produces a maximum of the computed cross correlation coefficients $C_i$ for a given adjacent trace X; and (d) computing, as a function of said maximum coefficient time alignments for each adjacent trace X and of said reference trace R, the coherent signal component COH.

11. The method of claim 10 wherein the step of computing the coherent signal component associated with N traces is performed according to the linear average relationship $$COH_j = \frac{A_i + B_i + R_j + D_i + E_i + \cdots}{N}$$

where the index i represents the index of the time alignment of each adjacent trace X=A, B, D, E——relative to the window edge which produces said maximum correlation coefficient C for that adjacent trace, the index j represents the j th data point in said search window on the reference trace R and the coherent signal COH.

12. The method of claim 10 wherein:

(a) the step of computing the component portion of said reference trace R corresponding to said coherent signal COH is performed by computing the least square fit coefficient K of said coherent signal COH and said reference trace R according to the relationship $$K = \frac{\sum_{j=1}^{L} COH_j \cdot R_j}{\sum_{j=1}^{L} COH_j^2}$$

where in index j represents the j th point on the traces R and COH; and (b) forming the coherent component portion RCOMP of the reference signal $$RCOMP_j = K \cdot R_j$$

where the index j again refers to the j th point on the trace R in said search window.

13. A method of enhancing unmoved out seismic data in a gather of common depth point seismogram traces, said data having a coherent signal component comprising a measure of the similarity between spatially related time series data, and a noise component, comprising the steps of:

(a) selecting a trace in said gather to function as a reference trace R;

(b) selecting a time $T_R$ on said trace R;

(c) determining times $T_X$ on one or more traces X included in said gather at which possible events common to a possible event at $T_R$ on trace R occur;

(d) cross correlating equal time length trace segments on traces X and R to derive time alignments for producing a coherent signal component segment COH from a segment of said reference trace R;

(e) forming said coherent signal component segment COH on an output record medium in time alignment with said reference trace segment; and (f) repeating steps (a), (b), (c), (d) and (e) with each trace in the gather functioning as the reference trace until all of said gather is processed to form an enhanced gather of coherent seismogram traces on said output record medium.

14. A method as defined in claim 15 further including the steps of:

(a) subtracting said coherent signal components segment from said reference trace segment and forming the difference signal on an output noise record medium in time alignment with said reference trace segment; and (b) repeating the foregoing steps until the entire gather is processed to form an enhanced gather of coherent traces on said output record medium and a separate noise gather comprised of said difference signals formed on said output noise record medium.

15. A method as defined in claim 13 wherein:

(a) said equal time length trace segments are centered on times $T_R$ and $T_X$ to define a search window having parallel edges located at each end of said segments, a length equal to the length of said segments and a width sufficient to contain said trace R and said one or more traces X;

(b) said cross correlation is sequentially performed and said window is incremented at one-half window lengths to define new times $T_R$ on said reference trace and times $T_X$ on traces X.

16. A method as defined in claim 15 wherein, prior to said cross correlation, the data points of said trace R are operated on by a mathematical operator to produce a tapered trace segment.

17. A method as defined in claim 16 wherein, prior to forming said coherent signal segment COH on said record medium, said segment COH is operated on by a mathematical operator to taper the data points of said signal segment COH smoothly.

* * * * *